UNITED STATES PATENT OFFICE.

FREDERICK S. STRONG AND FREDERICK C. MANN, OF EAST BRIDGEWATER, MASSACHUSETTS.

AUXILIARY FEED MECHANISM FOR COTTON-SEED LINTERS.

SPECIFICATION forming part of Letters Patent No. 503,997, dated August 29, 1893.

Application filed November 14, 1892. Serial No. 451,988. (No model.)

*To all whom it may concern:*

Be it known that we, FREDERICK S. STRONG and FREDERICK C. MANN, both of East Bridgewater, in the county of Plymouth and State of Massachusetts, have invented certain new and useful Improvements in Auxiliary Feed Mechanism for Cotton-Seed Linters, of which the following, taken in connection with the accompanying drawings, is a specification.

Our invention relates to a device to be applied to the feeding-in chute of the hopper of a cotton-seed linter, and consists of an auxiliary feed roller, operated by an automatic mechanism co-respondent to the amount of seed in the hopper.

Figure 1:
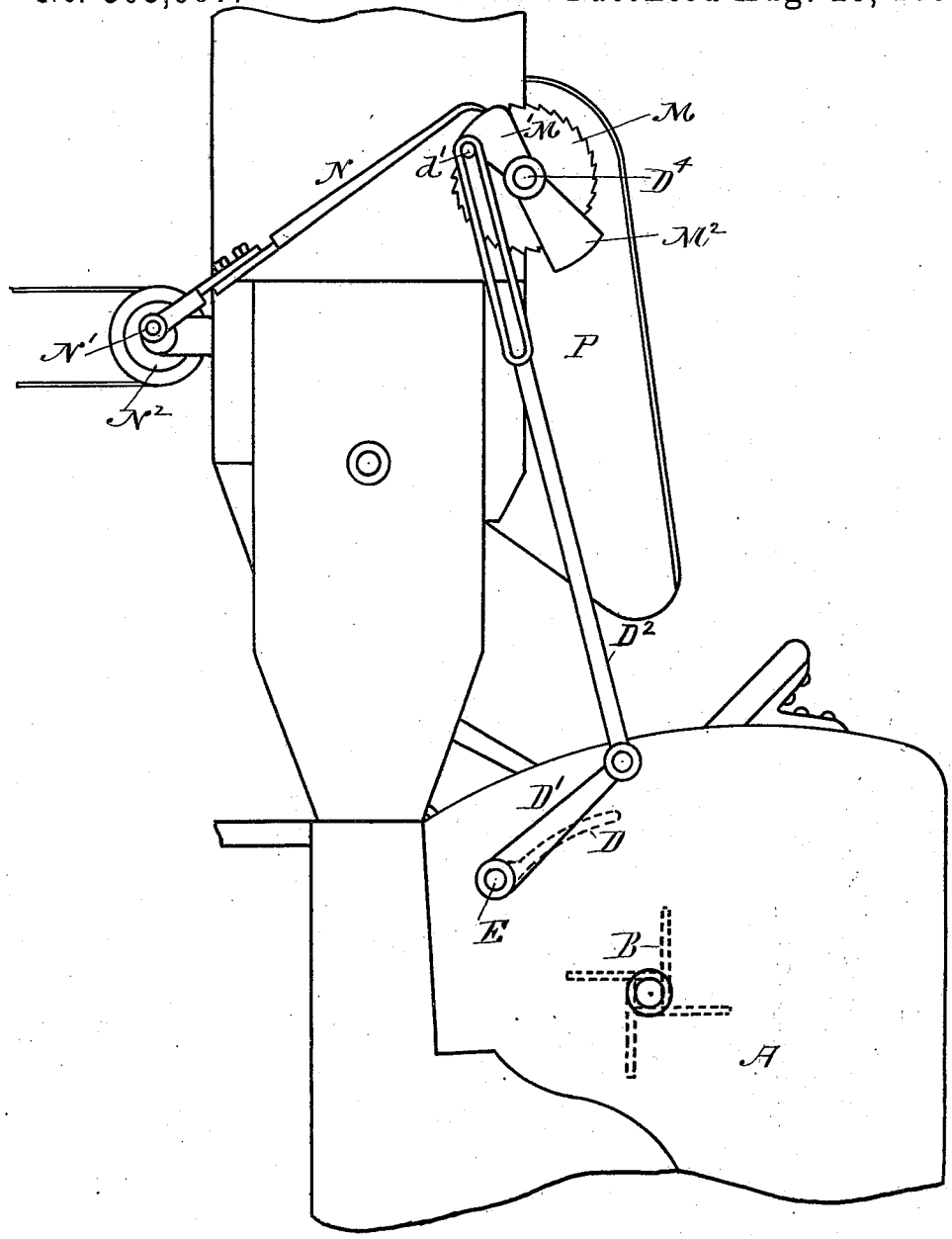
Figure 2:
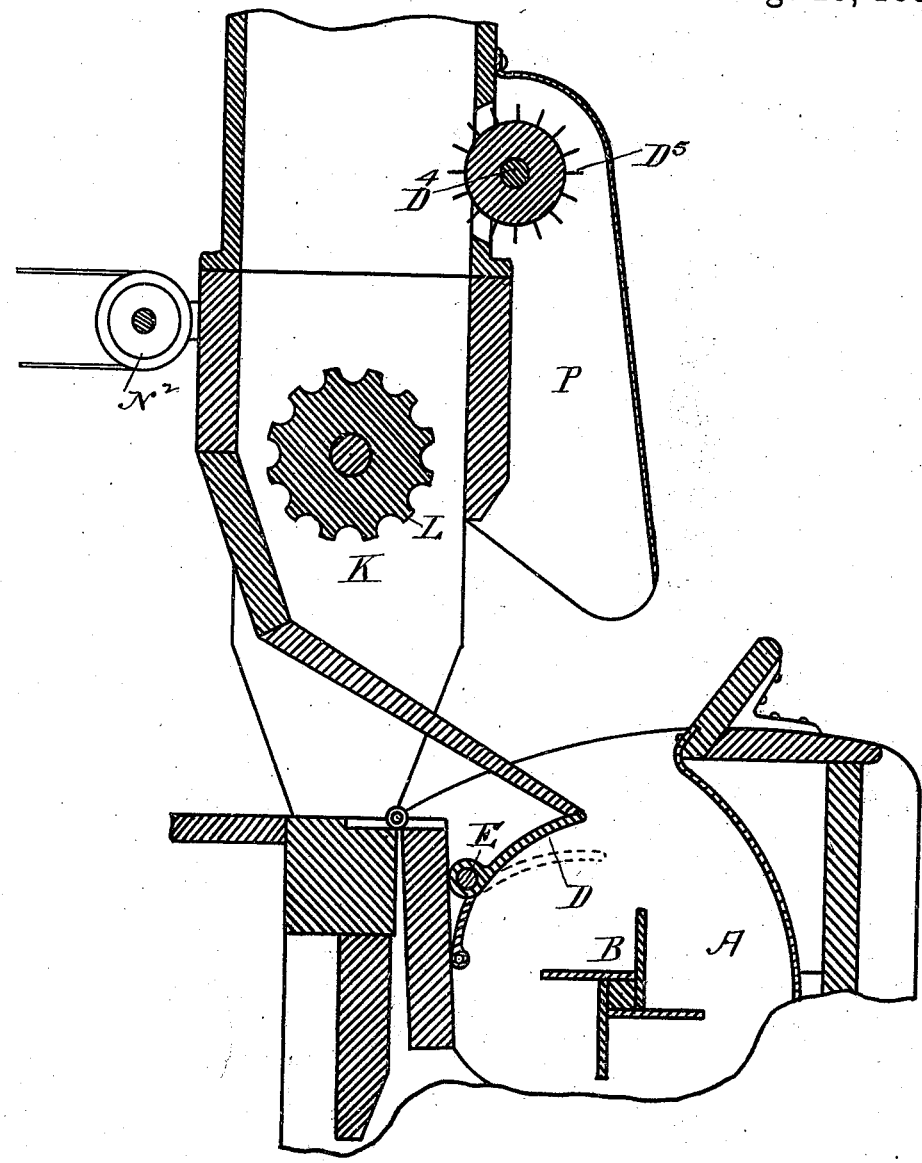

The device is illustrated in the accompanying drawings, in which Figure 1 is a side elevation, showing parts of a linter, and our device attached. Fig. 2 shows the same in vertical section.

In the drawings, A represents the hopper of the linter, and B a winged roller which serves to keep the mass of the seed in motion,—that is, to rotate it,—and thus to bring each seed within the field of action of the saws. The casing of the hopper is made in the usual manner, except that a part D is made automatically adjustable, that is, it is pivoted at its lower edge at E and rests as a float upon the mass of the seed that is being rotated in the hopper, it being represented by full lines when in its normal position, and by dotted lines (see Fig. 2) when not in its normal position. In other words, when the hopper A is normally full of seed, then the float D is in the position shown by full lines, and when the hopper is not as full as it ought to be, the float, not being supported by the mass of seeds, drops to or toward the position shown by dotted lines. The float D is mounted upon a shaft E, to which it is rigidly attached; this shaft E extends through the side of the casing of the hopper, as indicated in Fig. 1, and has an arm D' attached to it; this arm D' is connected by a pitman D² to a pin d' on the shield M', said shield M' being pivoted as shown, so that it may be made to swing about an axis concentric with the axis of the ratchet wheel M, and has a counter weight M² to react against the action of the pitman D². The function of the shield M' is to prevent or allow (as the case may be) the pawl N to engage with the teeth of the ratchet wheel M, and to determine the number, if any, of the teeth that may be passed at each motion of the pawl. The ratchet wheel M is rigidly attached to a shaft D⁴, which is also attached to a winged feed wheel D⁵, so that when the ratchet M is turned, a corresponding rotation of the feed wheel D⁵ takes place.

The pawl N is operated by a crank pin N', which is connected to a shaft driven by the pulley N².

The action of our device is as follows: If from any cause the feed wheel L does not feed fast enough (although it has plenty of seed above it) to keep sufficient stock in the hopper A, then the float D will fall and acting through the shaft E, arm D' and pitman D², will move the shield M' and allow the pawl N to actuate the auxiliary feed roller D⁵, and thus supply the hopper A through the chute P.

The operation of our device is as follows: When from any cause there is not a sufficiency of seed in the hopper A, the float D will swing downward, and acting through the shaft E, arm D' and link D⁵ will draw the shield M' out from under the end of the pawl N and allow it to act upon the teeth of the ratchet wheel M, thus causing the auxiliary feed roller D⁵ to carry seed over into the second chute P and thence into the hopper A. This action will continue until the normal amount of seed is in the hopper, and the float D will be forced upward, and the shield M thrown back under the ends of the pawl N, thus stopping the motion and work of the auxiliary feed wheel D⁵.

We claim—

In a cotton seed linter, the combination of a hopper, a main feed mechanism, an auxiliary feed mechanism, a float adapted to rest upon the seed in the hopper, with means for connecting said float with said auxiliary feed wheel, substantially as and for the purpose set forth.

In testimony whereof we have signed our names to this specification, in the presence of two subscribing witnesses, on this 11th day of November, A. D. 1892.

FREDERICK S. STRONG.
FREDERICK C. MANN.

Witnesses:
FRANK G. PARKER,
WILLIAM H. PARRY.